US008542090B2

(12) United States Patent
Calvet et al.

(10) Patent No.: US 8,542,090 B2
(45) Date of Patent: Sep. 24, 2013

(54) ANTI-THEFT SAFETY SYSTEM FOR A PORTABLE, MANUALLY OPERATED TOOL, AND THE ADAPTED TOOL OF THE SYSTEM

(75) Inventors: Pierrick Calvet, St. Nazaire les Eymes (FR); Nicolas Guihard, Caluire et Cuire (FR); Florent La Bella, Romans sur Isere (FR); Pascale Grandjean, Valence (FR)

(73) Assignee: Societe de Prospection et, Bourg les Valence (FR)

( * ) Notice: Subject to any disclaimer, the term of this patent is extended or adjusted under 35 U.S.C. 154(b) by 1119 days.

(21) Appl. No.: 12/089,937

(22) PCT Filed: Oct. 12, 2006

(86) PCT No.: PCT/IB2006/002855
§ 371 (c)(1), (2), (4) Date: Apr. 11, 2008

(87) PCT Pub. No.: WO2007/042924
PCT Pub. Date: Apr. 19, 2007

(65) Prior Publication Data

US 2008/0236220 A1 Oct. 2, 2008

(30) Foreign Application Priority Data

Oct. 14, 2005 (FR) ..................................... 05 10476

(51) Int. Cl.
*G05B 19/00* (2006.01)
*G06F 7/00* (2006.01)
*H04B 1/00* (2006.01)

(52) U.S. Cl.
USPC .................... 340/5.6; 340/572.1; 340/539.13; 340/5.1; 340/12.5

(58) Field of Classification Search
USPC .................... 340/5.6, 572.1, 539.13, 5.1, 5.2, 340/12.5; 70/263; 307/10.2
See application file for complete search history.

(56) References Cited

U.S. PATENT DOCUMENTS

| | | | | |
|---|---|---|---|---|
| 5,955,951 | A * | 9/1999 | Wischerop et al. | 340/572.8 |
| 6,005,489 | A | 12/1999 | Siegle et al. | |
| 6,801,130 | B2 * | 10/2004 | Campero | 340/572.1 |
| 7,119,686 | B2 * | 10/2006 | Bertness et al. | 340/572.1 |
| 7,132,947 | B2 * | 11/2006 | Clifford et al. | 340/572.3 |
| 7,242,304 | B2 * | 7/2007 | Clancy et al. | 340/572.9 |
| 7,298,240 | B2 * | 11/2007 | Lamar | 340/5.6 |
| 7,330,129 | B2 * | 2/2008 | Crowell et al. | 340/815.4 |
| 7,339,477 | B2 * | 3/2008 | Puzio et al. | 340/572.1 |
| 2001/0033228 | A1 * | 10/2001 | Kisreman et al. | 340/568.1 |
| 2004/0108120 | A1 | 6/2004 | Wiesner et al. | |
| 2005/0035659 | A1 | 2/2005 | Hahn et al. | |

FOREIGN PATENT DOCUMENTS

| | | | |
|---|---|---|---|
| DE | 10029138 | A1 | 1/2002 |
| GB | 2353323 | A | 2/2001 |

OTHER PUBLICATIONS

ISR for PCT/IB2006/002855 mailed Feb. 2, 2007.

* cited by examiner

*Primary Examiner* — Nam V Nguyen
(74) *Attorney, Agent, or Firm* — Lowe Hauptman & Ham, LLP

(57) ABSTRACT

The system includes, inside the tool, an electronic module for locking/unlocking the tool, in order to block or authorize its use and, inside a control station, a control module for the tool's locking/unlocking module designed to switch it from the locked state (i1) to the unlocked state (I0). The system applies well to tools for sealing, nailing and other similar applications.

8 Claims, 1 Drawing Sheet

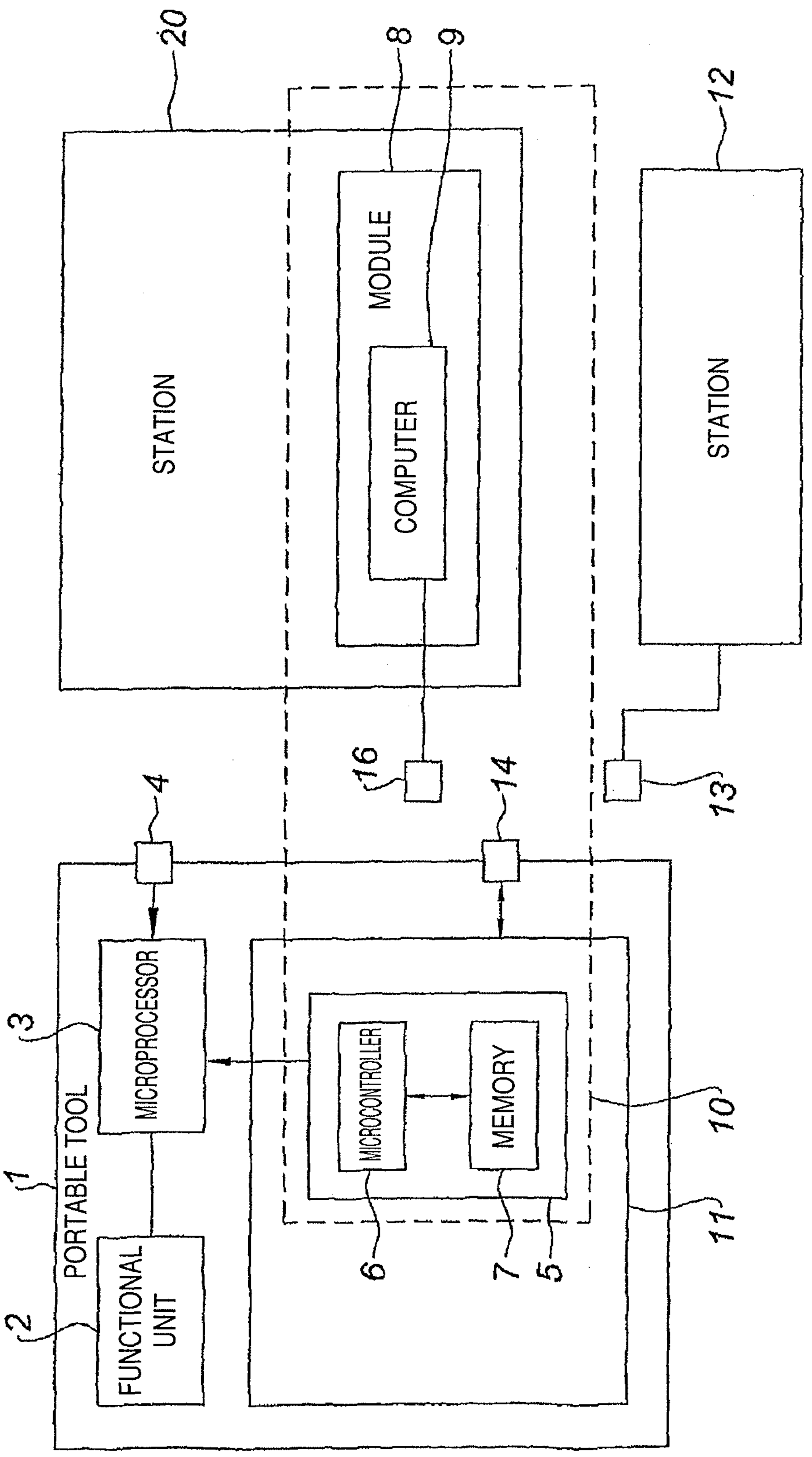
STATION
MODULE
COMPUTER
STATION
PORTABLE TOOL
MICROPROCESSOR
FUNCTIONAL UNIT
MICROCONTROLLER
MEMORY
1
2
3
4
5
6
7
8
9
10
11
12
13
14
16
20

ANTI-THEFT SAFETY SYSTEM FOR A PORTABLE, MANUALLY OPERATED TOOL, AND THE ADAPTED TOOL OF THE SYSTEM

RELATED APPLICATIONS

The present application is based on International Application Number PCT/IB2006/002855 filed Oct. 12, 2006, and claims priority from French Application Number 05 10 476 filed Oct. 14, 2005, the disclosures of which are hereby incorporated by reference herein in their entirety.

FIELD OF THE INVENTION

The invention relates to portable tools used in the construction industry, such as tools for sealing, fastening, nailing, screwing, stapling, drilling, or other saws, punches, etc.

BACKGROUND ART

These devices are now commonly sold in stores or commercial establishments also known as "superstores," in order to satisfy a clientele composed of individuals or professionals. Such being the case, they are commonly the object of shoplifting.

In order to prevent this disadvantage, a rudimentary method has currently been adopted, which consists in "locking down" the tools, as is done for all electronic devices or electrical household appliances such as radios, telephones, etc.

This requires sellers to involve the customer interested in purchasing a tool to prepay for it at a cash register or check-out station before "unlocking" it, upon presentation of the sales slip, so that it can be carried away. The process is therefore bothersome for both the client and the seller.

It may be noted that the problem is the same in warehouses for storing tools.

SUMMARY OF THE INVENTION

The applicant has sought a more practical means of prevention against this type of theft and it is for this reason that the invention is herein proposed.

Therefore, the invention relates first of all to an anti-theft system for a portable, manually operated tool comprising, inside the tool, an electronic module for locking/unlocking the tool, in order to block or authorise its use and, inside a control station, a control module for the tool's locking/unlocking module designed to switch it from the locked state to the unlocked state.

The tool being blocked in the locked state before passing on to the control station, in this case a cash register or check-out station, it is only upon passing on to this control station that it is unlocked and that its use is authorised.

Preferably, the tool's locking module is designed to switch from the locked state to the unlocked state under the action of an electronic unlocking key loaded into the tool's module by the control station's control module.

In the preferred embodiment of the system and tool of the invention, the tool's locking/unlocking module comprises a microcontroller and a memory storage intended to receive the electronic unlocking key and to be read by the microcontroller in order to unlock the tool.

In the system of the invention, the unlocking key of the control station can be loaded into the tool by a wire or radio-link connection, thanks to a computer of the control station's control module.

The invention likewise relates to the adapted portable, manually operated tool 1 of the system, comprising an electronic locking/unlocking module for blocking or authorising the use of the tool, the module being designed to receive an electronic unlocking key and to switch the tool into the unlocked state.

The tool may comprise a diagnostic module for after sales service and, in this case, it is interesting that this connecting circuit ensures loading of the electronic unlocking key.

More preferably still, the tool's locking/unlocking module is, connected to a transponder for receiving the electronic unlocking key.

BRIEF DESCRIPTION OF THE DRAWINGS

The invention will be better understood in light of the following description of the anti-theft system for a portable automatic tool in accordance with the invention and of the single FIGURE accompanying it in which the preferred embodiment of the anti-theft system is shown as function blocks distributed over the tool and check-out station.

DETAILED DESCRIPTION OF THE DRAWINGS

The portable tool 1 comprises a functional unit 2, including, for example, a combustion chamber, its fuel supply, its piston for driving a fastening element, etc, in the case of a gas-operated fastening device.

In order to control the unit 2 and monitor its proper functioning, the tool comprises a control module 3, which, in this case, is a microprocessor 3 connected to a manual control 4.

In this case, the tool 1 also comprises a module 5 for electronic locking/unlocking of the microprocessor 3. This module 5 comprises a memory 7 and a microcontroller 6.

In the initial state I1, the memory 7 is empty or nil. In this initial state I1, or any other state I2 except for a specific and unique unlocked state I0, the microprocessor 3 does not transmit any command issued by the manual control 4 to the unit 2. The tool 1 remains locked and unusable in as much as the memory 7 is not in the state 10.

In reality, the locking/unlocking module 5 is part of a system 10 which is an anti-theft tool 1 and, furthermore, this system 10 comprises a control module 8 external to the tool 1, designed to shift the memory 7 from the state I1, or any other state I2, to the state I0.

The control module 8 may, for example, be built into a check-out or sales station 20.

It comprises a computer 9, making it possible, by means of the microcontroller 6, to changer from the state I1 or I2 of the memory 7, to the specific state 10.

In order to accomplish this, according to a relatively simple first embodiment of the invention, the microcontroller 6 and the computer 9 are connected by a wireless connection by a transmitter 16 and a receiver 14. For example, the module 5 is conventionally connected to a transponder circuit 14 and, when passing on to the station 20, the computer 9 activates the transponder 14 by means of a transmitter 16 in order to transmit to it an unlocking key. The microcontroller 6 then changes the state of the memory 7 to the state 10. The change is state is picked up by the microprocessor 3 which unlocks the tool 1, which becomes usable.

Conversely, if the tool 1 is removed fraudulently, without passing through the check-out station 20, the electronic key not being stored in memory 7, it remains blocked and therefore unusable.

According to a more developed but preferred embodiment of the invention, the tool 1 comprises a diagnostic module 11 for after-sales service.

This module 11 records into the memory 7 the events impacting the tool 1 during use. At the same time, provision is made so that an after-sales station 12 might be able to read the recording of these events into this memory 1 during, a maintenance or troubleshooting operation, e.g., by means of a wire connection <RS 432 or other connection) established by means of a record reading port 14 of the tool 1 that can be connected to a record data acquisition port 13 of the station 12.

In this preferred embodiment the microcontroller 6 and the computer 9 are connected by the same wire connection as the one used by the station 12, and the control module 8 comprises a port 16 provided to be connected to the reading port 14.

In the example of the FIGURE, the locking/unlocking module S is part of the module 11, which makes it possible to manage the locking of the tool 1 via station 12.

The operation thus works in the same way as the one in the previously described simplified embodiment of the invention.

The invention claimed is:

1. An anti-theft system for a portable tool, comprising:

a tool module disposed inside said portable tool for electronically locking the portable tool in a locked inoperable state and unlocking the portable tool from the locked inoperable state to an unlocked operable state, said tool module comprising a microcontroller for receiving an electronic unlocking key readable by said microcontroller, a manual controller, wherein said manual controller is directly connected to a microprocessor;

a control station at a point-of-sale for said portable tool, said control station comprising a control module operably communicating with said tool module, wherein said control module automatically transmits said electronic unlocking key to said microcontroller when the sale of the portable tool is valid, wherein said microcontroller changes the locked inoperable state of a memory to the unlocked operable state, wherein said microcontroller reads said electronic unlocking key, and wherein said microcontroller sends a state signal to the microprocessor to switch a functional unit from the locked inoperable state to the unlocked operable state, thereby rendering said portable tool operable.

2. The system according to claim 1, wherein said tool module is designed to switch from the locked state (I1) to the unlocked state (I0) under the action of an electronic unlocking key loaded into the tool's (1) locking/unlocking module by the control station's control module.

3. The system according to claim 2, wherein the unlocking key of the control station is loaded into the tool by a wire connection.

4. The system according to claim 2, wherein the unlocking key of the control station is loaded into the tool by a radio-link connection.

5. The system according to claim 2, wherein said control module of said control station further comprises a computer for loading the unlocking key.

6. A portable tool customised to the system according to claim 1, comprising an electronic locking/unlocking module for blocking or authorising the use of the tool, the module being designed to receive an electronic unlocking key and to switch the tool into the unlocked state (I0).

7. The portable tool according to claim 6, comprising a diagnostic module for after-sales service and a connecting circuit in order to connect the tool (1) to an after-sales station, in which the connecting circuit ensures loading of the electronic unlocking key.

8. The portable tool according to claim 6, in which the locking/unlocking module is connected to a transponder for receiving the electronic unlocking key.

* * * * *